Patented Nov. 4, 1941

2,261,168

UNITED STATES PATENT OFFICE 2,261,168

PREPARATION OF CYCLOPROPANE

William A. Lott, East Orange, N. J., assignor to E. R. Squibb & Sons, New York, N. Y., a corporation of New York No Drawing. Application April 30, 1937, Serial No. 139,986

9 Claims. (Cl. 260—666)

This invention relates to the preparation of cyclopropane, particularly an essentially pure cyclopropane for anesthetic use. Cyclopropane is a valuable general anesthetic, producing surgical anesthesia with comparative safety even at high levels of muscular relaxation and in extended surgical procedures, giving fairly short and uneventful induction and recovery periods.

Cyclopropane is a cyclic hydrocarbon having the structural formula

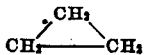

It has been prepared heretofore by the reduction of trimethylene dichloride with zinc in aqueous alcohol [Gustavson, J. Prakt. Chem. (2) 50, 380 (1894)], a process found to be very unsatisfactory on account of its meager yield.

It is an object of this invention to provide an economical process of preparing cyclopropane; more specifically, an improvement of the reduction method affording a commercially practical yield.

In the practice of this invention trimethylene dichloride is converted into cyclopropane by treatment with a metal reduction agent in the presence of a metal halide selected from the group consisting of bromides and iodides. It is believed that a double decomposition between the trimethylene dichloride and the metal halide occurs first and that the trimethylene dihalide thus formed is acted on by the metal reduction agent to produce cyclopropane; however, it is not intended that this invention shall be limited by any theory of operation.

Among the metals that may serve as reduction agents are zinc, magnesium, and sodium. These should preferably be in finely divided condition. The metal halides usable, which should preferably be water-soluble and alcohol-soluble, include the bromides and iodides of calcium, zinc, aluminum, and magnesium. It is desirable to employ an inert solvent, especially an alcohol—say the methyl, ethyl, or isopropyl—as the reaction medium; aqueous dilution of the alcohol will not materially affect the reaction.

The cyclopropane thus prepared is suitable for anesthetic use; but any vapor impurities present may be readily removed by treating the evolved gases with an adsorbent material such as carbon. The following example is illustrative of the invention:

267 g. of zinc dust is suspended with vigorous agitation in 400 cc. of 85% alcohol in which 255 g. of calcium bromide has been dissolved. The suspension is refluxed on a steam bath, and 120 g. of trimethylene dichloride is added in a fairly rapid stream. The gas evolved is collected by displacement of water over a period of 8 hours. 16.5 liters of a gas mixture is obtained, 57% thereof being cyclopropane, which may be separated from the mixture by fractional condensation.

The invention may be variously otherwise embodied, within the scope of the appended claims.

I claim:

1. The process of preparing cyclopropane which comprises reacting trimethylene dichloride with a metal reduction agent in the presence of a water-soluble metal bromide.

2. The process of preparing cyclopropane which comprises reacting trimethylene dichloride with a metal reduction agent in an alcoholic medium in the presence of a water-soluble metal bromide.

3. The process of preparing cyclopropane which comprises reacting trimethylene dichloride with a metal reduction agent in an aqueous alcoholic medium in the presence of a water-soluble metal bromide.

4. The process of preparing cyclopropane which comprises reacting trimethylene dichloride with zinc in the presence of a water-soluble metal bromide.

5. The process of preparing cyclopropane which comprises reacting trimethylene dichloride with zinc in an aqueous alcoholic medium in the presence of a water-soluble metal bromide.

6. The process of preparing cyclopropane which comprises reacting trimethylene dichloride with zinc in the presence of calcium bromide.

7. The process of preparing pure cyclopropane which comprises reacting trimethylene dichloride with a metal reduction agent in the presence of a water-soluble metal bromide, and treating the evolved gases with adsorbent carbon.

8. The process of producing cyclopropane, which consists in bringing 1,3-dichloropropane and zinc together in the presence of bromide ions.

9. The process of producing cyclopropane, which consists in bringing 1,3-dichloropropane and zinc together in the presence of zinc bromide.

WILLIAM A. LOTT.